Feb. 14, 1956  J. W. STEVENS  2,734,544
TWO PIECE NUT HAVING TENSIONING AND CAMMING LOCKING FEATURES
Filed April 2, 1952
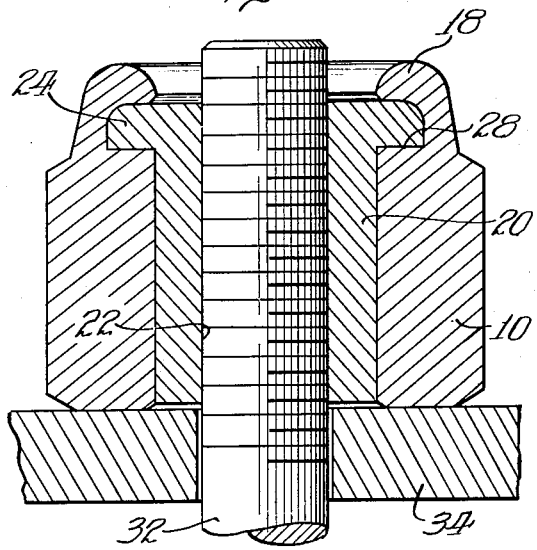
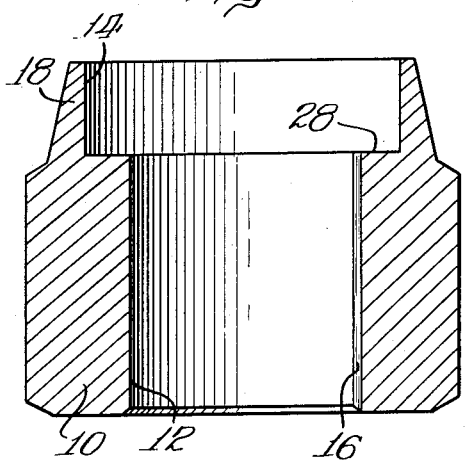
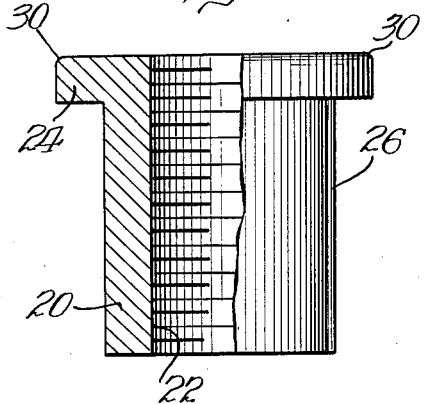
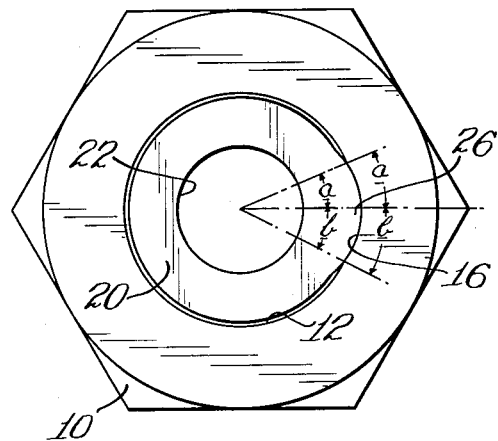
INVENTOR.
Jerome William Stevens
BY
Attys:

United States Patent Office 2,734,544
Patented Feb. 14, 1956

2,734,544

TWO PIECE NUT HAVING TENSIONING AND CAMMING LOCKING FEATURES

Jerome W. Stevens, Brookfield, Ill.

Application April 2, 1952, Serial No. 280,075

2 Claims. (Cl. 151—19)

The present invention relates to improvements in lock nuts of the character including a shell and an internally threaded insert interlocked with the shell and adapted to produce a locking force between itself, the shell, the threaded stud to which secured and the object against which the nut abuts.

Various types of lock washers and lock nuts are commercially known, but the type of lock nut referred to herein has not met with particular commercial success due to the failure to provide a commercially practical nut. Lock nuts of the general character are technically known, however. For example, a lock nut of the character referred to is disclosed in Patent No. 2,106,984 to A. G. M. Michell, issued February 1, 1938.

The Michell nut comprises generally a shell having a bore therethrough tapered inwardly from each end of the shell and a counterbore in one end having a hexagonal configuration, and an insert having a tapered external wall and a hexagonal radial flange at one end adapted to fit into the hexagonal recess in the shell. After the insert is positioned in the shell, the end of the insert opposite the flange is flared outwardly into engagement with the wall of the bore through the shell having a taper opposite the taper of the insert to lock the shell and insert together In use, the nut is threaded to a bolt until the lower surface of the shell engages the surface against which the nut is to be tightened. Additional turning of the nut thereafter effects an extension of the insert to lock the nut to the said surface against which the shell abuts.

Theoretically, the Michell nut appears to be sound. In practice, however, the nut suffers several disadvantages which render the nut commercially impractical. In the first instance, the shell and insert are relatively expensive of manufacture, requiring several forming operations in each of which close tolerances must be held. The assembly of the shell and the insert is not practical in that fracture and distortion of the insert and marring of the thread therein may readily occur during flaring of the insert. In use, clearance must be provided between the shell and the insert to accommodate extension of the insert. This clearance also accommodates radial expansion of the insert which results in less contact between the threads of the insert and the bolt, the possibility of stripping the threads in the insert, permanent set of the insert, loosening of the nut when subjected to impact and so on. Due to the freedom with which the insert may expand radially, the interlocking portions of the insert and shell may be readily distorted so that same accommodate relative rotational movement between the shell and insert. Furthermore, the reduced wall of the insert, at the juncture of the opposite tapers thereof, presents a point at which fracture may readily occur. In addition, the noted disadvantages cooperate to render the nut non-reusable.

An object of the present invention is to provide a lock nut of the character referred to that suffers none of the disadvantages of prior endeavors in the field and comprises a commercially practical product.

In accordance with the present invention, I provide a lock nut including a shell having a cylindrical bore therethrough and a cylindrical counterbore in one end thereof, and a cylindrical insert closely fitting within the bore of the shell and having a cylindrical radial flange or collar fitting within the counterbore in the shell. The counterbore in the shell is of greater axial extent than the collar on the insert so that portions of the shell may be rolled or peened over the collar to lock the shell and insert against relative axial disassociation. The shell and insert are locked against relative rotational movement by the provision of a longitudinal cam on the insert fitting within a longitudinal cam recess provided in the wall of the bore through the shell.

In view of the structure of the lock nut of the present invention, it will be appreciated that the nut has various advantages, among which are: The formation of the nut in an economical and readily accomplished manner; the assembly of the shell and insert in an entirely practical manner wherein there is no danger of objectionable distortion of the shell or insert during assembly; the uniform thickness of the walls of the insert and the close fit thereof in the shell acting to prevent radial distortion of the insert and its consequent disadvantages; and the ability of the nut to be used and reused indefinitely.

Other objects and advantages of the present invention will become apparent in the following detailed description of a preferred embodiment of the invention, wherein reference is made to the accompanying drawings, in which:

Figure 1 is a vertical cross-sectional view of the assembled nut threaded to a stud and abutting an object against which the nut is to be tightened;

Figure 2 is a vertical cross-sectional view of the shell, the view being taken substantially at 90° to Figure 1;

Figure 3 is a side view, partly in section and partly in elevation, of the insert, the view being taken substantially at 90° to Figure 1; and Figure 4 is a bottom plan view of the assembled nut.

Referring now to the drawings, the lock nut of the present invention is shown as including a shell 10 having a cylindrical bore 12 therethrough. The shell 10 is preferably formed from hexagonal stock and is provided at one end thereof with a cylindrical counterbore 14. A longitudinal groove or cam recess 16 is provided in one wall of the cylindrical bore 12, the cam recess preferably being of a depth of approximately .007 inches, Figures 2 and 4 being somewhat distorted to clearly show the groove 16. At the end thereof in which the counterbore 14 is formed, the hexagonal shell 10 is preferably formed of reduced section, as indicated at 18, for a purpose to be pointed out hereinafter.

The insert of the lock nut of the present invention is indicated generally at 20 and preferably comprises a cylindrical body portion of substantially the same diameter as the cylindrical bore 12 in the shell 10. In practice, the cylindrical body portion of the insert 20 may be formed of the same diameter or slightly smaller than the cylindrical bore 12 in the shell 10, as will be pointed out hereinafter. The cylindrical insert 20 is provided with a threaded bore 22 by means of which the nut is adapted to be threaded to a stud or other fastener. At one end thereof, the cylindrical insert 20 is provided with an outwardly extending radial flange or collar 24 which is preferably formed of approximately the same diameter or slightly smaller than the counterbore 14 in the shell 10. The cylindrical insert 20 is preferably of lesser axial extent than the shell 10 and, in particular, the flange 24 is of lesser axial extent than the counterbore 14 in the shell 10 and the cylindrical body portion of the insert 20 is of lesser axial extent than the cylindrical bore 12 in the shell 10. The cylindrical insert 20 is provided on the external surface of the cylindrical body portion thereof with a longitudinally extending cam 26 which is adapted to fit intimately within the longitudinal cam recess 16 provided in the cylindrical bore 12 in the shell 10. The longitudinal cam 26 preferably extends approximately .007 inch from the external cylindrical surface of the insert 20 so as to fit intimately within the longitudinal cam recess 16.

In manufacture, the shell 10 and the insert 20 may be formed in any conventional manner and it will be apparent from the accompanying drawings and foregoing description, that the formation of the shell and insert may be readily and economically accomplished in relatively few machining operations, all of a simplified nature. In production, the only critical dimensions are those of the diameter of the bore 12, the diameter of the cylindrical portion of the insert 20 and the radial extent of the recess 16 and the cam 26. The bore 12 is preferably held to a tolerance of +.002 inch and —.000 inch and the insert 20 is held to a tolerance of +.000 inch and —.002 inch. The recess 16 is preferably formed .007 inch deep and may be held to a tolerance of +.0005 inch and —.0000 inches. The cam 26 is preferably formed of a maximum radial extent of .007 inch and is held to the tolerance of the cylindrical portion of the insert 20. The recess 16 and cam 20 are preferably arcuate and if the dimensions stated are adhered to, the minimum radial engagement of the cam in the recess will be .003 inch. While the dimensions of the bore 12, the insert 20, the recess 16 and the cam 26 are preferably held to the relatively close tolerances stated, the structure and formation of the shell and insert are such that the tolerances are not outside the range of modern mass production standards.

In assembly, the insert 20 is positioned within the cylindrical bore 12 in the shell 10, with the cam 26 being received in the longitudinal recess 16, so that the shell 10 and the insert 20 may be readily slid into assembled relation. When assembled, the lower end of the insert 20 is spaced from the lower end of the shell 10 and the radial flange 24 of the insert 20 is received within the counterbore 14 of the shell 10 with the lower surface of the flange abutting against a shoulder 28 in the shell 10 formed at the juncture of the bore 12 and the counterbore 14 therein. The reduced upper end 18 of the shell 10 extends axially above the upper surface of the radial flange 24 of the insert 20 so that the upwardly extending portion of the shell 10 may be readily rolled or peened over into engagement with the upper surface of the flange 24 to lock the shell 10 and the insert 20 together to prevent axial disassociation of the two. The upper edges of the radial flange 24 are preferably rounded, as indicated at 30, to readily accommodate the peening or rolling of the upper portions 18 of the shell 10 over the flange 24.

When assembled, the shell 10 and insert 20 are locked against relative axial disassociation by means of the interlocking portions of the flange 24 of the insert 20 and the peened over portions 18 and the shoulder 28 of the shell 10. The interlocking relation between the flange 24 and the shell 10 is such that a very slight amount of relative axial movement between the shell and the insert may take place, but that axial disassociation of the two elements is prevented. The insert 20 and the shell 10 are locked against relative rotational movement by engagement of the cam 26 within the cam recess 16 in the bore 12 of the shell 10. I have found that the provision of a single small cam fitting within a single small longitudinal cam recess presents such resistance to relative rotational movement that the cooperating threads between the nut and the fastener to which the nut is attached will strip much more readily than the cam 26 will be sheared from the surface of the insert 20 or will be disengaged from the recess 16. Accordingly, the provision of a plurality of interlocking portions between the insert and the shell, as previously regarded as necessary, are obviated by the present invention to substantially reduce the cost of manufacture and assembly of lock nuts of the general character referred to herein.

In use, the lock nut is adapted to be threaded to a conventional threaded stud or bolt 32 and adapted to be moved into engagement with a plate 34, or the like, against which the nut is to be tightened. In being threaded to the stud 32, the shell 10 and the insert 20 rotate simultaneously about the axis of the stud 32 until the lower surface of the shell 10 engages the surface of the plate 34. Continued rotation of the nut with respect to the stud 32 will not effect any further substantial axial movement of the shell 10, but will effect slight axial movement of the insert 20 to move the lower surface of the flange 24 into intimate abutting and locking engagement with the shoulder 28 of the shell 10. In addition, the insert 20 may be slightly elongated to provide a positive tensile lock between the insert and the stud, between the insert and the shell and between the shell and the object against which the shell abuts. Accordingly, the nut of the present invention provides for positive locking engagement between the fastener with which associated and the surface against which the nut is tightened.

From the foregoing it will be appreciated that the lock nut of the present invention suffers no distortion or radial expansion that would set up a permanent stress within either the insert or the shell and, accordingly, the engagement between the threads of the insert and the threads of the stud will be positive and according to established standards and, at the same time, the lock nut of the present invention may be readily removed from the stud and reused whenever desired. It will be apparent, therefore, that the present invention provides an improved lock nut enjoying advantages heretofore unattained.

Referring now to Figure 4, the cam recess 16 and the cam 26 have each been divided into equal halves, indicated by the arcs $a$ and $b$. As will be appreciated, the portions $a$ and $b$ of the cam recess 16 are exactly complementary to the portions $a$ and $b$, respectively, of the cam 26. Due to predetermined machining tolerances, the insert 20 is capable of slight rotational movement within the shell 10 when the assembly of the shell and insert is completed. When the lock nut is applied to a threaded member, such as the stud 32, and rotation is imparted to the shell 10 in a direction to tighten the nut on the threaded member, the portion $b$ of the cam recess 16 will be moved into engagement with the portion $b$ of the cam 26. Due to the fact that the two portions $b$ are complementary to one another, force is applied to the insert 20 from the shell 10 throughout the entire area of the complementary portions $b$ of the longitudinal cam recess 16 and the longitudinal cam 26. Accordingly, the surface engagement between the two members is substantial and conjoint rotation of the shell and insert without the danger of distortion of either of the members is insured. During tightening movement, the portions $a$ of the cam recess 16 and the cam 26 may be slightly spaced apart due to the tolerances allowed in machining, but, as pointed out, the surface engagement between the recess 16 and the cam 26 is more than adequate to provide for the conjoint rotation of the shell 10 and insert 20.

When the shell 10 is rotated in the opposite direction, to loosen the same with respect to the threaded member 32 and the plate 34, the portion $a$ of the cam recess 16 will be moved into engagement with the portion $a$ of the cam 26 and the two cam portions will be in complementary engagement with one another to effect conjoint rotation of the shell and the insert in the direction to loosen the same with respect to the threaded member. Accordingly, in either direction of rotation, large area contact is insured to provide a highly efficient locking action.

In view of the foregoing, it will be appreciated that one feature of the present invention resides in the provision of interfitting cam means to lock the insert and shell together for conjoint rotation. As opposed to other types of interfitting or interlocking means, the cam means of the present invention provides a complete working surface, which is of great advantage in maintaining the shell and insert together for use and frequent reuse. In its preferred embodiment, the cam of the present invention is in the form of a segment of a cylinder formed integrally with the insert and presenting a complete working surface throughout the peripheral area thereof.

The lock nut of the present invention is preferably formed of metal so that same is entirely fire resistant and adapted to maintain a locked relationship between the elements with which associated for indefinite periods of time. However, if desired, the lock nut of the presnt invention may be formed of other materials according to particular design requirements.

While I have described what I regard to be a preferred embodiment of my invention, it will be apparent to those skilled in the art that various changes, rearrangements and modifications may be made therein without departing from the spirit and scope of the invention, as defined by the appended claims.

I claim:

1. A lock nut consisting of an integral circumferentially continuous shell having an axial cylindrical bore therethrough and an axial cylindrical counterbore in one end thereof defining a radial shoulder in said shell, said shell having a longitudinal cam recess in the wall of the bore therethrough extending from said shoulder to the opposite end of said shell, said cam recess being of substantial circumferential extent and being parti-cylindrical and substantially less than semi-cylindrical in cross section, and an integral circumferentially continuous insert of a length less than said shell, said insert consisting of a generally cylindrical body portion conformably received within said bore and a radial flange of a thickness less than the length of said counterbore conformably received within said counterbore, said flange resting on its inner surface on said shoulder, wall portions of said shell at said one end thereof overlying the outer surface of said flange and retaining said insert and said shell against axial disassociation, said body portion of said insert being of a length less than said bore in said shell to accommodate axial extension of said insert, said insert including on said body portion thereof a longitudinal radially projecting cam extending the length of said body portion, said cam being of substantial circumferential extent and being parti-cylindrical and substantially less than semi-cylindrical in cross section, said cam being of a size smaller by a predetermined amount than said cam recess and being received within said cam recess, said cam recess and said cam accommodating slight rotational movement of said insert in said shell, said wall portions of said shell accommodating slight axial movement and rotation of said insert in said shell, said cam and said cam recess having complementary complete working surfaces normally engaged but rotatably movable with respect to one another, the working surfaces of said cam and said cam recess being relatively rotatable into a cam-locked position to lock said insert in said shell, said shell having an irregular exterior surface for reception of a wrench, said insert having an axial threaded bore therethrough for reception of a bolt, the lock nut being applied to a bolt with said body portion of said insert first engaging the bolt and being threaded to the bolt by application of force to said shell, application of rotational force to said shell after said shell engages an abutment stressing said insert in tension and said shell in compression due to the engagement of said flange with said shoulder, and finally rotating said shell relative to said insert to cam said cam into locking engagement in said cam recess, whereby the nut is locked to the bolt by virtue of the tension load on said insert, the compression load on said shell, and the locked engagement of said cam in said cam recess.

2. A lock nut consisting of an integral circumferentially continuous shell having an axial cylindrical bore therethrough and an axial counterbore in one end thereof defining a radial shoulder in said shell, said shell being of reduced outer diameter substantially from said shoulder to said one end to define a portion of substantially reduced wall thickness, said shell from said shoulder to the opposite end thereof having a relatively thick wall and an irregular exterior surface for reception of a wrench, said shell having a single longitudinal cam recess in the wall of said bore extending from said shoulder to said opposite end, said cam recess being of substantial circumferential extent, being considerably less than semi-cylindrical in cross section and corresponding to a segment of a cylinder of a diameter greater than the thickness of said thick wall and less than the diameter of said shell, and an integral circumferentially continuous insert of a length less than said shell, said insert consisting of a generally cylindrical body portion conformably received within said bore and a radial flange of a thickness less than the length of said counterbore conformably received within said counterbore, said flange resting on its inner surface on said shoulder, said portion of said shell of reduced wall thickness being rolled into engagement with the outer surface of said flange to retain said insert and said shell against axial disassociation, said flange having a rounded outer corner facilitating the rolling of said end portion of said shell and accommodating rotation of said insert in said shell after rolling, said rolled end of said shell accommodating slight axial movement of said insert within said shell, said body portion of said insert being of a length slightly less than the length of said shell from said shoulder to said opposite end thereof to accommodate axial extension of said insert within said shell, said body portion of said insert having a single intergral longitudinal radially projecting cam on the exterior surface thereof extending the length of said body portion and fitting within said cam recess, said cam being considerably less than semi-cylindrical in cross section and defining a segment of a cylinder of predetermined smaller diameter than the cylinder defined by said cam recess, said cam being of substantial circumferential extent and generally conforming to the cross section of said cam recess, said cam recess and said cam accommodating slight rotational movement of said insert in said shell and having complementary complete working surfaces normally engaged but rotatable with respect to one another into and out of a cam-locked position, said insert having an axial threaded bore therethrough for reception of a bolt, the lock nut being applied to a bolt with said body portion of said insert first engaging the bolt, the lock nut being threaded to the bolt by application of rotational force to said shell whereupon a portion of the surface of said cam recess is moved into engagement with the complementary portion of the surface of said cam to rotate said insert and thread the same onto the bolt until said opposite end of said shell engages an abutment, subsequent tightening of the lock nut stressing said insert axially, due to the engagement of said flange with said shoulder, to tension said insert and impose a compression load on the portion of said shell between said shoulder and said opposite end thereof, and finally rotating said shell relative to said insert to move said cam into cam-locked engagement in said cam recess.

References Cited in the file of this patent

UNITED STATES PATENTS

| | | |
|---|---|---|
| 275,898 | Ford | Apr. 17, 1883 |
| 721,352 | Applin | Feb. 24, 1903 |
| 2,005,348 | Michell | June 18, 1935 |
| 2,106,984 | Michell | Feb. 1, 1938 |
| 2,385,851 | Swanstrom | Oct. 2, 1945 |
| 2,399,639 | Kelly | May 7, 1946 |
| 2,509,647 | Lipscomb | May 30, 1950 |
| 2,677,407 | McKenzie | May 4, 1954 |

FOREIGN PATENTS

| | | |
|---|---|---|
| 436,952 | Germany | Nov. 11, 1926 |
| 448,230 | Italy | May 12, 1949 |